US009889882B2

(12) United States Patent
Uranaka et al.

(10) Patent No.: US 9,889,882 B2
(45) Date of Patent: Feb. 13, 2018

(54) DUMP TRUCK

(71) Applicant: Komatsu Ltd., Minato-ku, Tokyo (JP)

(72) Inventors: Kyouji Uranaka, Yokohama (JP);
Taiga Sasaki, Hitachinaka (JP);
Kouichi Okamoto, Yokohama (JP);
Takeo Ootsuka, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/122,059

(22) PCT Filed: Feb. 27, 2014

(86) PCT No.: PCT/JP2014/054978
§ 371 (c)(1),
(2) Date: Aug. 26, 2016

(87) PCT Pub. No.: WO2015/129010
PCT Pub. Date: Sep. 3, 2015

(65) Prior Publication Data
US 2017/0015352 A1   Jan. 19, 2017

(51) Int. Cl.
*B60G 3/20* (2006.01)
*B62D 7/14* (2006.01)
(Continued)

(52) U.S. Cl.
CPC ............... *B62D 7/142* (2013.01); *B60G 3/20* (2013.01); *B60G 7/005* (2013.01); *B60P 1/04* (2013.01);
(Continued)

(58) Field of Classification Search
CPC .... B62D 33/02; B62D 21/186; B62D 33/037; B62D 55/06; B62D 12/00; B62D 33/0273;
(Continued)

(56) References Cited

U.S. PATENT DOCUMENTS 3,599,819 A  *  8/1971  Leijon .................... E02F 3/422
                                                    298/17.6
3,704,040 A  *  11/1972  Davis .................... B60B 11/00
                                                    280/6.154
(Continued)

FOREIGN PATENT DOCUMENTS

CN      201872800      6/2011
CN      202242844      5/2012
(Continued)

OTHER PUBLICATIONS

International Preliminary Report on Patentability in corresponding International Application No. PCT/JP2014/054978, dated Aug. 30, 2016, 6 pages.
(Continued)

*Primary Examiner* — Glenn Dayoan
*Assistant Examiner* — Sunsurraye Westbrook
(74) *Attorney, Agent, or Firm* — Fish & Richardson P.C.

(57) ABSTRACT

A dump truck includes a suspension and a steering mechanism. The suspension includes: a suspension arm in a form of an upper arm having an up-and-down movable proximal end supported on a vehicle body frame; and a tire support in a form of a casing rotatably attached to a distal end of the upper arm. The steering mechanism includes a steering cylinder having a proximal end attached to the upper arm and a distal end attached to a knuckle arm provided to the tire support.

5 Claims, 12 Drawing Sheets

(51) Int. Cl.
*B60P 1/04* (2006.01)
*B62D 5/12* (2006.01)
*B62D 7/18* (2006.01)
*B62D 21/11* (2006.01)
*B60G 7/00* (2006.01)
*B62D 5/06* (2006.01)
*B62D 7/06* (2006.01)
*B62D 21/18* (2006.01)

(52) U.S. Cl.
CPC .............. *B62D 5/06* (2013.01); *B62D 5/12* (2013.01); *B62D 7/06* (2013.01); *B62D 7/18* (2013.01); *B62D 21/11* (2013.01); *B60G 2200/144* (2013.01); *B60G 2200/422* (2013.01); *B60G 2200/44* (2013.01); *B60G 2300/026* (2013.01); *B60G 2300/50* (2013.01); *B60Y 2200/142* (2013.01); *B60Y 2400/84* (2013.01); *B62D 21/186* (2013.01)

(58) Field of Classification Search
CPC .... B62D 33/0625; B60K 13/04; B60K 11/00; B60K 11/02; B60K 11/04; B60K 13/02; B60K 15/063; B60K 17/046
USPC ........ 298/17 R, 22 R, 17.5, 2, 11, 24, 23 M, 298/23 R; 410/121, 143, 77, 80; 414/809, 498, 24.5, 420, 495, 563
See application file for complete search history.

(56) References Cited

U.S. PATENT DOCUMENTS

| | | | |
|---|---|---|---|
| 5,472,062 A | 12/1995 | Nagai et al. | |
| 5,957,235 A * | 9/1999 | Nishimura | B60K 17/043 180/306 |
| 6,086,076 A * | 7/2000 | Prem | B60G 3/14 180/24.07 |
| 6,408,973 B1 * | 6/2002 | Beesley | B60K 17/306 180/245 |
| 6,578,925 B1 | 6/2003 | Baker et al. | |
| 6,783,187 B2 | 8/2004 | Parsons | |
| 8,104,842 B2 * | 1/2012 | Fushiki | B62D 21/186 298/17 R |
| 2004/0080206 A1 | 4/2004 | Parsons | |
| 2012/0230843 A1 * | 9/2012 | Ravipati | G05D 23/1932 417/46 |
| 2014/0367189 A1 | 12/2014 | Minoshima et al. | |

FOREIGN PATENT DOCUMENTS

| | | |
|---|---|---|
| JP | H05-193373 | 8/1993 |
| JP | H05-254327 | 10/1993 |
| JP | 2013-248928 | 12/2013 |
| WO | WO 2013/129090 | 9/2013 |

OTHER PUBLICATIONS

International Search report in corresponding International Application No. PCT/JP2014/054978, dated Jun. 3, 2014, 6 pages, with English translation.

Office Action in Chinese Application No. 201480076114.2, dated Jun. 2, 2017, 14 pages, with English translation.

\* cited by examiner

DUMP TRUCK

CROSS-REFERENCE TO RELATED APPLICATIONS

This application claims priority to International Application No. PCT/JP2014/054978 filed on Feb. 27, 2014, the contents of which are incorporated herein in their entirety.

TECHNICAL FIELD

The present invention relates to a dump truck, for instance, a large-sized driverless off-road dump truck.

BACKGROUND ART

A large-sized dump truck working in mines and the like has been typically known. As a steering mechanism of front wheels (steering wheels) of such a dump truck, there has been typically known a steering mechanism including a yoke that is a part of a suspension and has a up-and-down movable proximal end supported on a vehicle body frame, a receiving seat rotatably attached to a distal end of the yoke, a knuckle arm attached to the receiving seat, and a steering cylinder extending between the knuckle arm and the vehicle body frame to connect the knuckle arm and the vehicle body frame (for instance, Patent Literature 1).

Moreover, an off-road dump truck has also been known for having steering wheels as all the tires in order to improve delivery performance (for instance, Patent Literatures 2 and 3).

CITATION LIST

Patent Literatures

Patent Literature 1: JP-A-5-193373
Patent Literature 2: U.S. Pat. No. 6,578,925
Patent Literature 3: U.S. Pat. No. 6,783,187

SUMMARY OF THE INVENTION

Problems to be Solved by the Invention

In Patent Literature 1, since a proximal end of the steering cylinder is connected to the vehicle body and a distal end of the steering cylinder is connected to the knuckle arm, when the receiving seat moves up and down in conjunction with the yoke in an operation of the suspension, the knuckle arm attached to the receiving seat also moves up and down to slightly change a distance between the vehicle body and the knuckle arm. Accordingly, this change affects an advance and retraction amount of the steering cylinder to cause an unstable steering amount of the tire during the up-and-down motion of the receiving seat.

Patent Literatures 2 and 3 in which a four-wheel steering is employed fail to specifically disclose the steering mechanism.

An object of the invention is to provide a dump truck having a steering mechanism capable of obtaining a desired steering amount without receiving an influence from an up-and-down motion of a suspension.

Means for Solving the Problems

According to an aspect of the invention, a dump truck includes a vehicle body frame; a suspension; a steering mechanism; tires suspended from the vehicle body frame via the suspension and configured to be steered by the steering mechanism and travel the dump truck; and a body supported by the vehicle body frame and configured to be raised and lowered, the suspension including: a suspension arm having a up-and-down movable proximal end supported on the vehicle body frame; and a tire support rotatably attached to a distal end of the suspension arm, the steering mechanism including: a steering cylinder having a proximal end attached to the suspension arm and a distal end attached to a knuckle arm provided to the tire support.

According to the above aspect of the invention, since the steering cylinder is attached to connect the knuckle arm and the suspension arm, a positional relationship between which is hardly changed in an up-and-down motion direction during the up-and-down motion of the suspension, even when the suspension moves up and down during its operation, such a change does not affect an advance and retraction amount of the steering cylinder, so that a steering amount of the tires can be stabilized to provide a desired steering amount.

In the above aspect, it is preferable that the suspension arm includes an upper arm and a lower arm that are attached to the vehicle body frame such that the upper arm is arranged above the lower arm, and the proximal end of the steering cylinder is attached to the upper arm.

With this arrangement, since the steering cylinder is disposed at a high position in the same manner as the upper arm, the steering cylinder can be kept from being hit by gravel and the like on a road to prevent damage of the steering cylinder.

In the above aspect, it is preferable that the vehicle body frame includes a support that supports the suspension arm such that the suspension arm is movable up and down, the suspension arm includes a steering cylinder attachment arm extending over the support and further extending inward in a vehicle width direction, and the proximal end of the steering cylinder is attached to the steering cylinder attachment arm.

With this arrangement, since the proximal end of the steering cylinder is attached to the steering cylinder attachment arm extending inward in the vehicle body frame among the suspension arm, a sufficient distance from this attachment position to an attachment position of the steering cylinder to the knuckle arm can be ensured. Accordingly, since the steering cylinder to be used is sufficiently long in an axial direction, the maximum steering amount (maximum steering angle) can be increased to improve a rotation performance.

In the above aspect, it is preferable that, viewed in a travel direction, the steering cylinder has an axial line overlapping a line passing through a rotation center of the suspension arm and the tire support and traversing a motion center of the suspension arm on the vehicle body frame.

With this arrangement, respective up-and-down motion regions to be required for respective up-and-down motions of the suspension arm and the steering cylinder can be the same when viewed in the travel direction, so that suspension arm and the steering cylinder can be easily prevented from interfering with other members.

In the above arrangement, it is preferable that the vehicle body frame includes a cross member provided in the vehicle width direction, the cross member supports a lower end of a hoist cylinder configured to raise and lower the body, and the steering cylinder is disposed opposite the hoist cylinder across the cross member in the travel direction.

With this arrangement, the hoist cylinder body that is requisite for raising and lowering the body can be reliably avoided from interfering with the steering cylinder.

According to another aspect of the invention, a dump truck includes a vehicle body frame; a suspension; a steering mechanism; tires suspended from the vehicle body frame via the suspension and configured to be steered by the steering mechanism and travel the dump truck; and a body supported by the vehicle body frame and configured to be raised and lowered, the suspension including: an upper arm having an up-and-down movable proximal end supported on an upper support provided to the vehicle body frame; a lower arm having an up-and-down movable proximal end supported on a lower support provided to the vehicle body frame; and a tire support rotatably attached between respective distal ends of the upper and lower arms, in which the upper arm includes a steering cylinder attachment arm extending over the support and further extending inward in a vehicle width direction, the steering mechanism includes a steering cylinder having a proximal end attached to the steering cylinder attachment arm and a distal end attached to a knuckle arm provided to the tire support, and viewed in the travel direction, the steering cylinder has an axial line overlapping a line passing through a rotation center of the upper arm and the tire support and traversing a motion center of the upper arm on the vehicle body frame.

According to the above aspect of the invention, the same advantages as those of the above-described invention having the same arrangement can be obtained.

DESCRIPTION OF EMBODIMENT(S)

Exemplary embodiment(s) of the invention will be described below with reference to the attached drawings.

Figure 1:
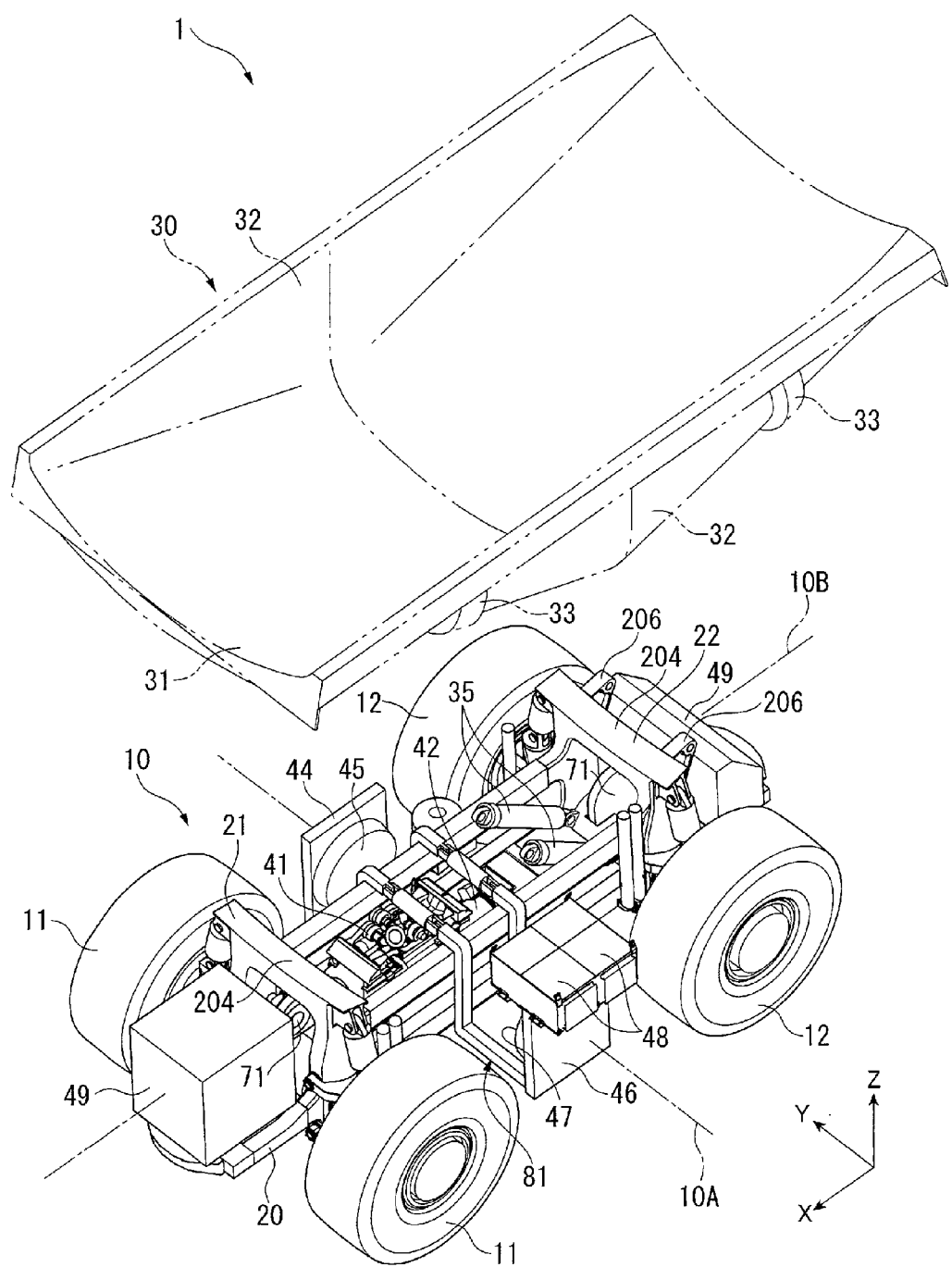
FIG. 1 is a partially-exploded perspective view of a dump truck according to an exemplary embodiment of the invention.
Figure 2:
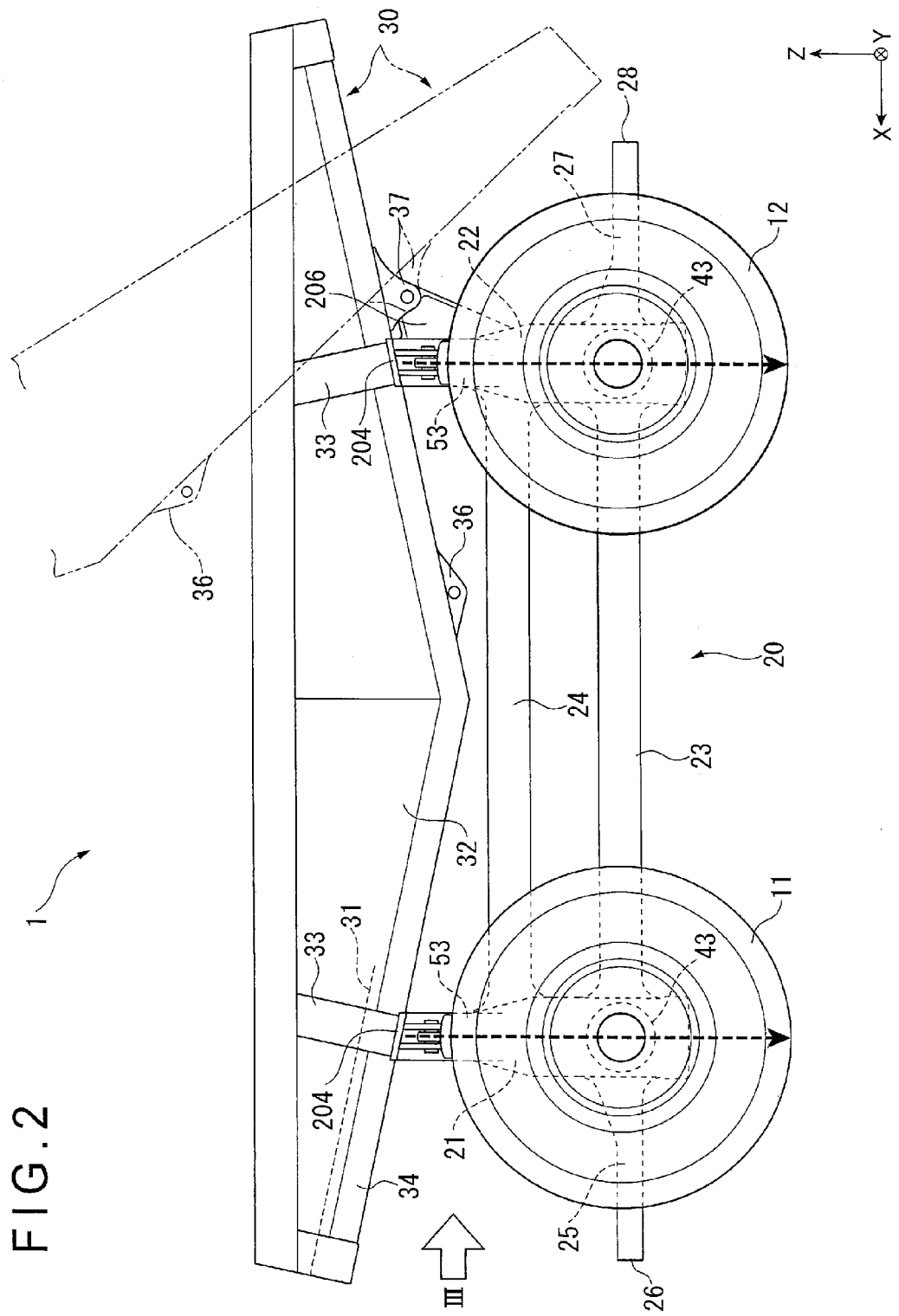
FIG. 2 is a side view of the dump truck.

FIGS. 1 to 4 are respectively a partially-exploded perspective view, a side view, an illustration of the dump truck in a travel direction, which is viewed in a direction indicated by an arrow III in FIG. 2, and a plan view of a dump truck according to an exemplary embodiment of the invention.

X, Y and Z axes in the drawings are orthogonal to each other in the exemplary embodiment. For convenience of the explanation, in the exemplary embodiment, with reference to FIG. 1, a first travel direction of the dump truck 1 is defined as an arrow direction of the X axis while a second travel direction thereof is defined as an opposite direction of the arrow direction of the X axis, a first vehicle width direction of the dump truck 1 is defined as an arrow direction of the Y axis while a second vehicle width direction thereof is defined as an opposite direction of the arrow direction of the Y axis, and a first vertical direction of the dump truck 1 is defined as an arrow direction of the Z axis while a second vertical direction thereof is defined as an opposite direction of the arrow direction of the Z axis. Moreover, in the following exemplary embodiment, the first travel direction, the second travel direction, the first vehicle width direction and the second vehicle width direction are sometimes respectively referred to as "front," "rear (back)," "right" and "left".

Overall Description of Dump Truck

As shown in FIG. 1, a dump truck 1 is a driverless off-road dump truck configured to travel by remote control. For instance, the dump truck 1 is a vehicle working at a mining site for developing mines. The remote control is performed fully using information communication technology such as a communication means set at a control center and the dump truck 1 and GPS (Global Positioning System).

The dump truck 1 includes a vehicle body 10 configured to travel with use of a pair of left and right tires 11, 11 and a pair of left and right tires 12, 12, the tires 11, 11 being set on both vehicle-width-directional sides of the vehicle body 10 in the first travel direction, the tires 12, 12 being set on both vehicle-width-directional sides of the vehicle body 10 in the second travel direction. The vehicle body 10 includes: a vehicle body frame 20 extending along the travel direction and to which the tires 11, 12 are provided; a load-carrying body 30 that is supported by the vehicle body frame 20 and configured to be raised and lowered (see a two-dot chain line in FIG. 2; devices 41 to 49 mounted on the vehicle body frame 20; a suspension 50 by which the tires 11, 12 are suspended from the vehicle body frame 20; and a steering mechanism. The dump truck 1, which is a vehicle dedicated for remote control, does not include a cab for a driver to operate, which is provided in a typical dump truck.

Explanation of Vehicle Body Frame

The vehicle body frame 20 will be described in details below.

Figure 3:
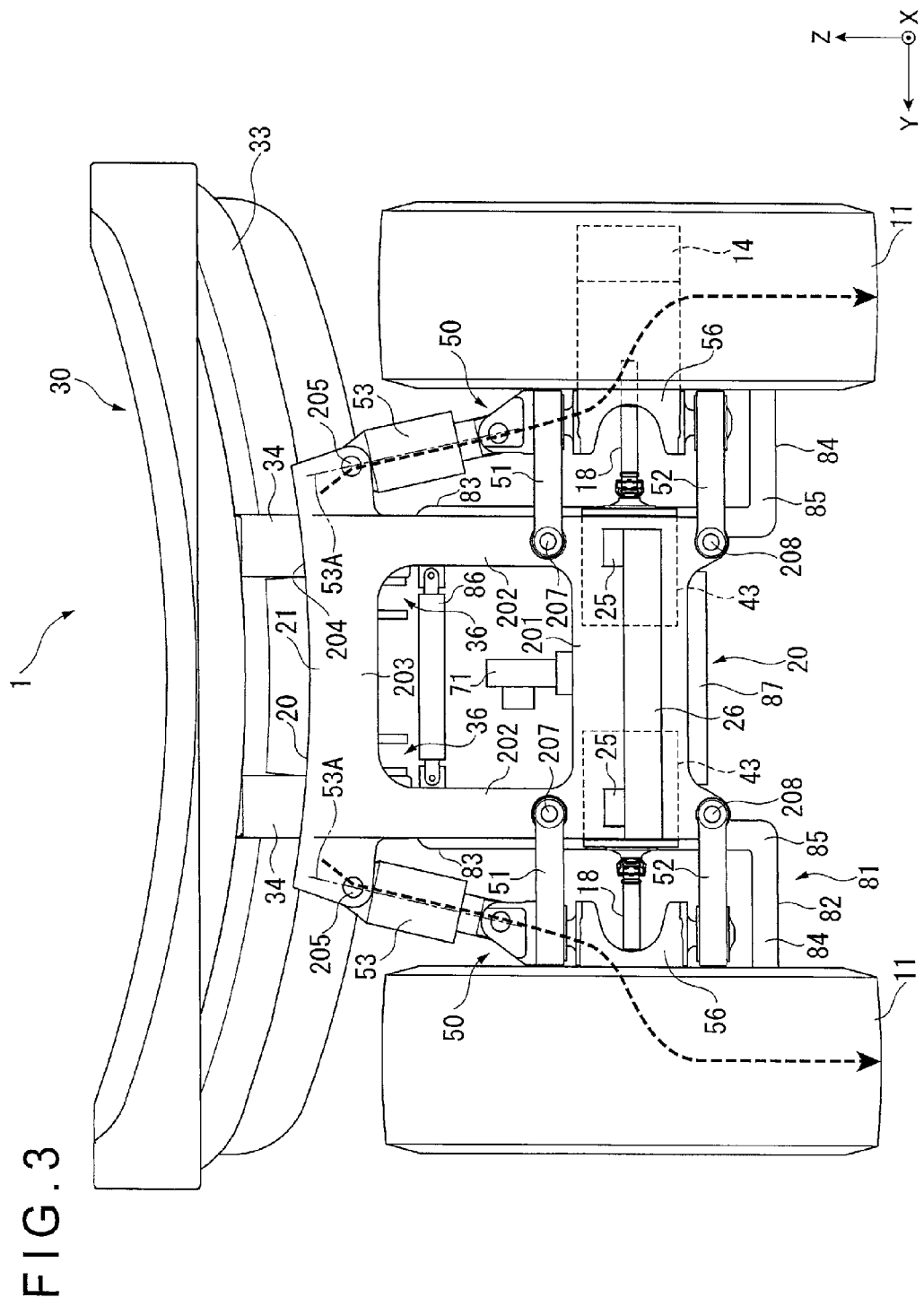
FIG. 3 is an illustration of the dump truck in a travel direction, which is viewed in a direction indicated by an arrow III in FIG. 2.
Figure 4:
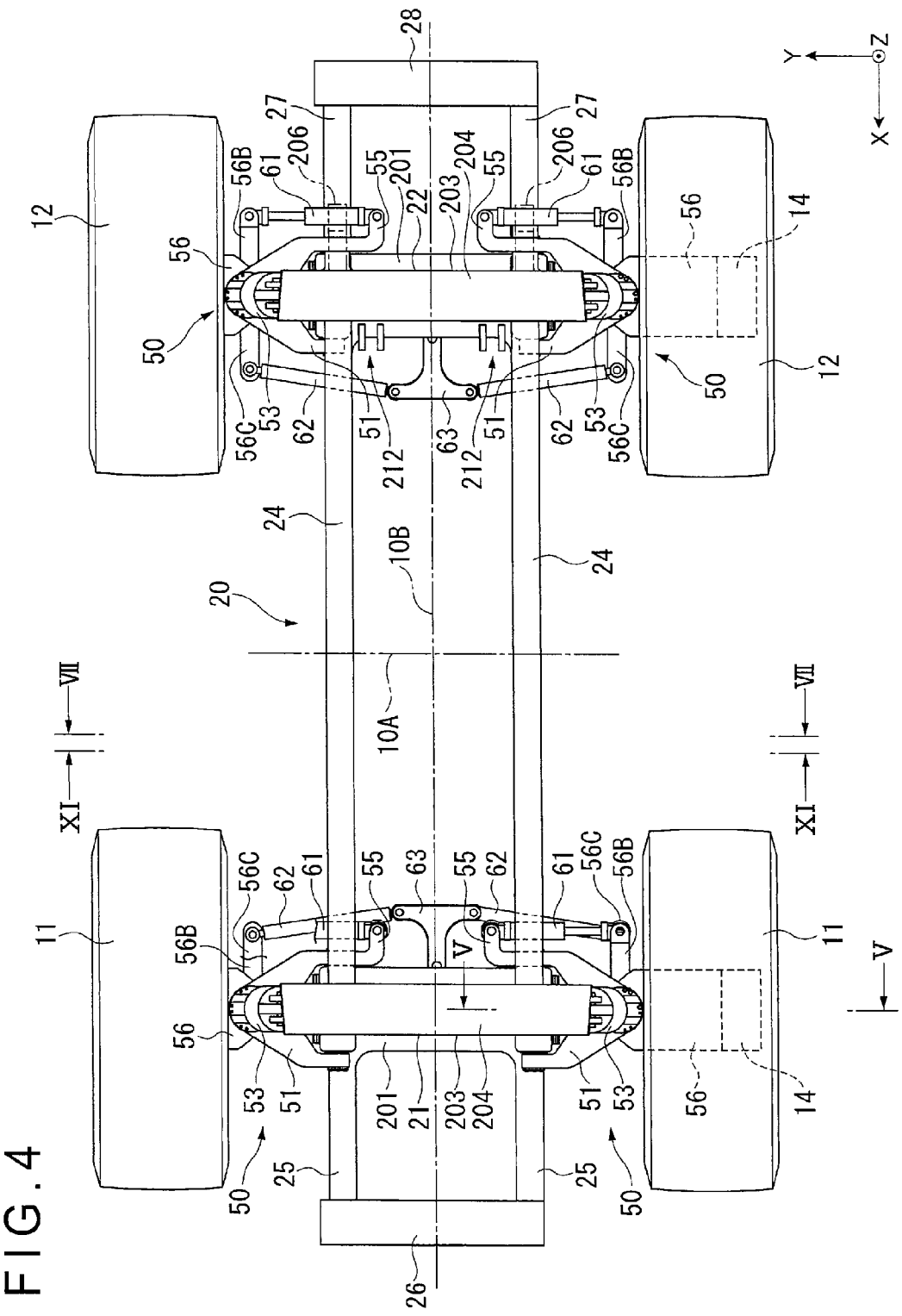
FIG. 4 is a plan view of the dump truck.

As shown in FIGS. 2 to 4, the vehicle body frame 20 includes: a lower cross member 201 (i.e., a lower one of cross members) provided at positions of the right and left tires 11 in the first travel direction (i.e., the right and left tires 11 provided to a first side of the vehicle body frame 20 in the travel direction) and extending in the vehicle width direction; a pair of right and left vertical members 202, 202 standing upward on both ends of the lower cross member 201; and an upper cross member 203 (i.e., an upper one of the cross members) extending in the vehicle width direction in a manner to connect upper ends of the respective vertical members 202. Among the above members, the pair of vertical members 202 and the upper cross member 203 define a first vertical frame 21 that vertically stands at the positions of the right and left tires 11 and has a portal shape viewed in the travel direction of the vehicle body 10 (see FIG. 3).

In other words, the vehicle body frame 20 in a side view includes the first vertical frame 21 that vertically stands at the positions of the tires 11 provided to the first side of the vehicle body frame 20.

The vehicle body frame 20 also includes: the lower cross member 201 provided at positions of the right and left tires 12 in the second travel direction (i.e., the right and left tires 12 provided to a second side of the vehicle body frame 20 in the travel direction) and extending in the vehicle width direction; a pair of right and left vertical members 202, 202 standing upward on both ends of the lower cross member 201; and an upper cross member 203 extending in the vehicle width direction in a manner to connect upper ends of the respective vertical members 202. Among the above members, the pair of vertical members 202 and the upper cross member 203 define a second vertical frame 22 that vertically stands at the positions of the right and left tires 12 and has a portal shape viewed in the travel direction of the vehicle body 10.

In other words, the vehicle body frame 20 in a side view includes the second vertical frame 22 that vertically stands at the positions of the tires 12 provided to the second side of the vehicle body frame 20.

The first vertical frame 21 and the second vertical frame 22 have substantially the same shape.

Ends of the front lower cross member 201 are connected to ends of the back lower cross member 201 by a pair of right and left lower side members 23, 23 disposed in parallel to each other in the travel direction and spaced from each other in the vehicle width direction. A vertical middle of the first vertical frame 21 is connected to a vertical middle of the second vertical frame 22 by a pair of right and left upper side members 24, 24 positioned above the lower side members 23, 23 (see FIG. 2).

Side members 25, 25 of a short length, which are respectively positioned on extension lines of the lower side members 23, 23, extend in the first travel direction from a lower portion of the first vertical frame 21. Ends of the respective side members 25, 25 are connected by a cross member 26. Side members 27, 27 of a short length, which are respectively positioned on extension lines of the lower side members 23, 23, extend in the second travel direction from a lower portion of the second vertical frame 22. Ends of the respective side members 27, 27 are connected by a cross member 28 along the vehicle width direction (see FIG. 4).

Figure 5:
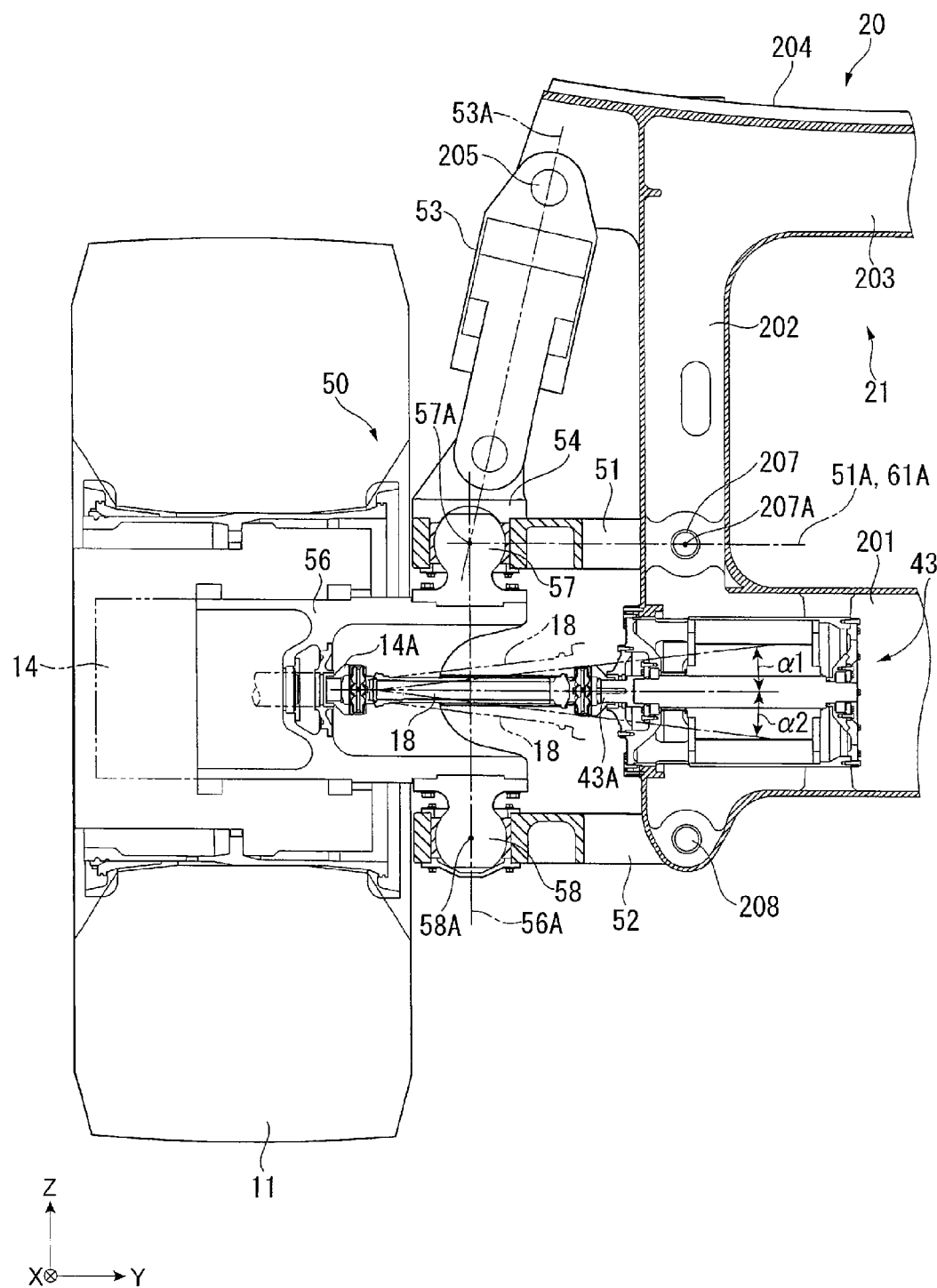
FIG. 5 is a cross-sectional view showing a suspension, which is viewed in a direction indicated by an arrow V-V in FIG. 4.

As shown in FIGS. 3 and 5, the lower cross member 201 on which the first vertical frame 21 stands is shaped in a hollow cylinder. Electric motors 43, 43 configured to independently respectively drive the tires 11, 11 via a drive shaft 18 are housed at both sides of an inside of the lower cross member 201. In the exemplary embodiment in which all the tires 11, 12 are to be driven, a pair of electric motors 43, 43 are also housed in the same manner as the above within the lower cross member 201 on which the second vertical frame 22 stands and are configured to independently respectively drive the tires 12. A final reduction gear 14 (a planet gear mechanism) is disposed between an end of the drive shaft 18 and a tire wheel.

An upper surface of the upper cross member 203 defining an upper portion of the first vertical frame 21 and an upper portion of the second vertical frame 22 is defined as a mount portion 204 that is a concave curve with a predetermined curvature. The body 30 is mounted only on the mount portion 204. A suspension support 205 supporting an upper end of a suspension cylinder 53 (a part of the suspension 50) is provided at each end of the upper cross member 203. A lower end of the suspension cylinder 53 is connected to an upper arm 51 (a part of the suspension 50). With this arrangement, the mount portion 204 is positioned on an axial line 53A of the suspension cylinder 53 configured to transmit a load downward (see FIG. 3).

The suspension 50 will be described later.

Herein, the load to be transmitted to a road surface through the tires 11, 12 includes a carrying load and a vehicle body load. The carrying load means a load defined by a weight of the body 30 loaded with goods. The vehicle body load means a load defined by a weight of the vehicle body 10 excluding weights of the tires 11, 12 and the body 30. In the exemplary embodiment, the vehicle body load and the carrying load are sometimes collectively referred to as an entire load.

Accordingly, the carrying load is transmitted from the mount portion 204 to the road surface through the suspension 50 (including the suspension cylinder 53) beneath the mount portion 204 and the tires 11, 12. Thus, the carrying load is transmitted through a short and simple transmission path (see dotted lines in FIGS. 2 and 3). In other words, the carrying load is transmitted without acting on the upper side member 24, the lower side member 23 and the like.

A shape of the entire vehicle body frame 20 is substantially plane-symmetrical to a vertical plane including a first center line 10A passing through the middle between the front tires 11 and the rear tires 12 and extending in the vehicle width direction, while being substantially plane-symmetrical to a vertical plane including a second center line 10B being orthogonal to the first center line 10A and extending in the travel direction through the middle between the tires in the vehicle width direction (see FIGS. 1 and 4).

Figure 9:
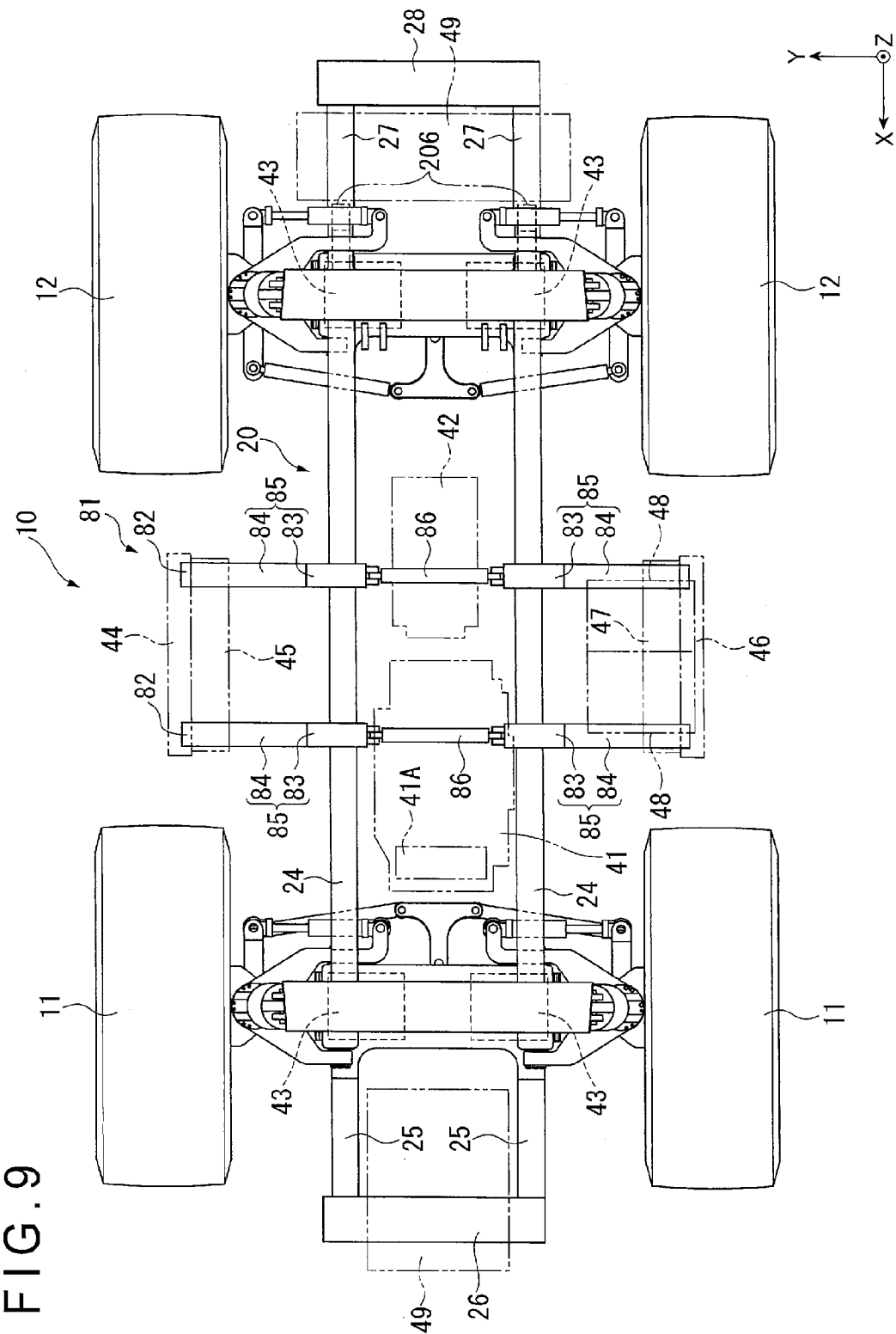
FIG. 9 is a plan view showing a layout of devices.
Figure 10:
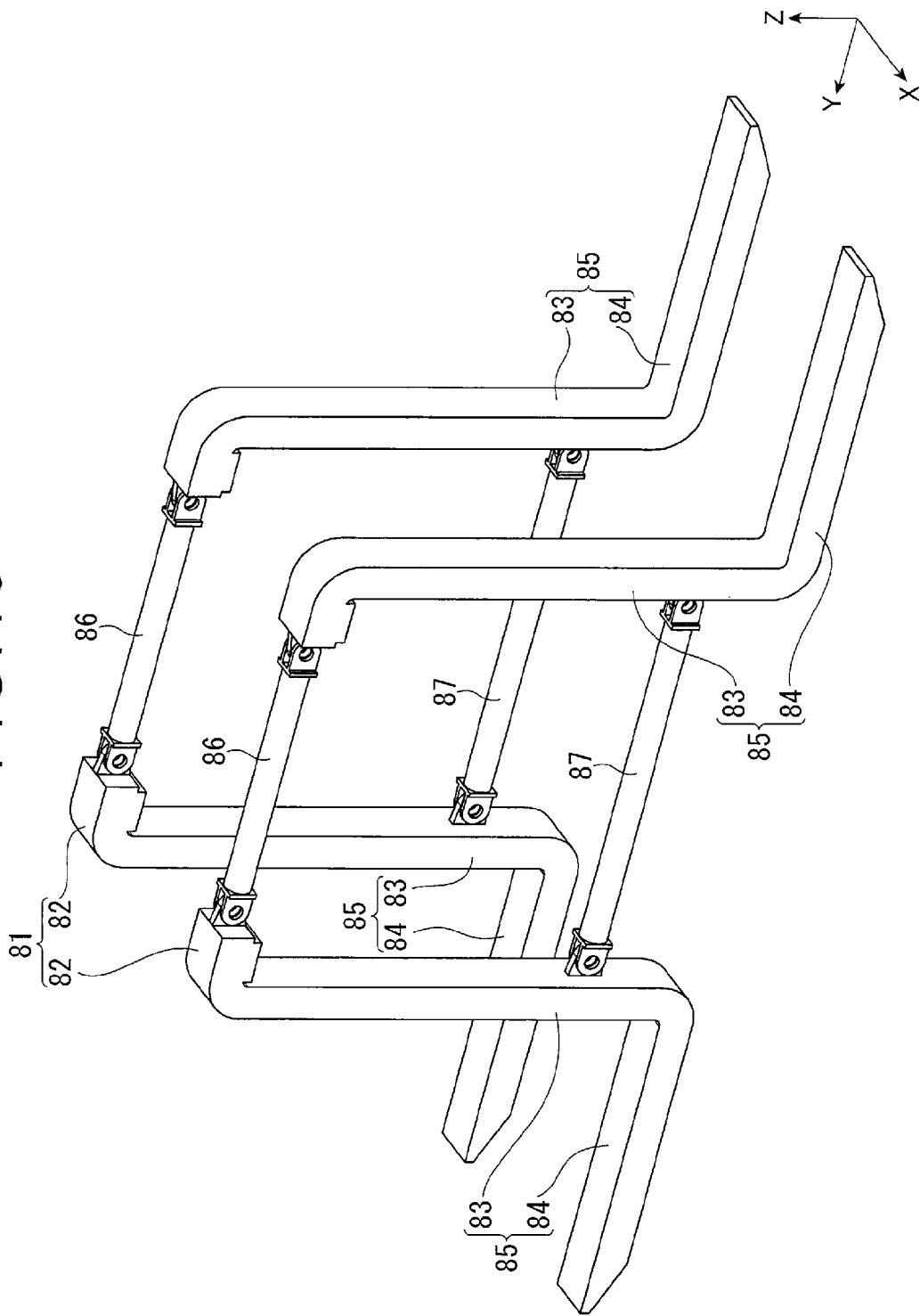
FIG. 10 is a perspective view showing an overall support frame.

Moreover, a support frame 81 is provided on the first center line 10A in the vehicle body frame 20 in a manner to bridge over the vehicle body frame 20 in the vehicle width direction. The support frame 81 is provided for supporting the devices 44 to 48 on the vehicle body frame 20. As shown in FIGS. 1, 9 and 10, the support frame 81 includes a pair of front and back sub frames 82 spaced from each other in the travel direction. The entire support frame 81 is shaped in a form of a saddle. Both sides of the support frame 81 project between the pair of front and back tires 11 and 12 on both the right and left sides of the vehicle body frame 20. Accordingly, the devices 44 to 48 supported by the support frame 81 are also disposed between the pair of front and back tires 11 and 12.

Specific disposition of the devices 44 to 48 will be described later.

Each of the sub frames 82 includes: a pair of right and left L-shaped frames 85 each including vertical portions 83 that are each fixed to the lower side member 23 and the upper side member 24 at both sides of the vehicle width direction and extensions 84 respectively horizontally extending toward the outside of the vehicle body frame 20 from lower ends of both the vertical portions 83 in the vehicle width direction; an upper connecting portion 86 connecting upper ends of the vertical portions 83 of the pair of right and left L-shaped frames 85 above the upper side member 24; and a lower connecting portion 87 connecting the respective lower ends of the vertical portions 83 of the pair of right and left L-shaped frames 85 under the lower side member 23.

The L-shaped frames 85 are detachably fixed to the lower side members 23 and the upper side member 24s with an unillustrated fastening unit (e.g., a bolt). The upper ends of the vertical portions 83 in each of the L-shaped frames 85 are detachably connected to the upper connecting portion 86 with a pin. The lower ends of the vertical portions 83 in each of the L-shaped frames 85 are detachably connected to the lower connecting portion 87 with a pin. Accordingly, the connection of each of the L-shaped frames 85 to the connecting portions 86 and 87 is provided by a flexible connection with a pin while each of the L-shaped frames 85 to the vehicle body frame 20 is kept firmly fixed, so that the L-shaped frames 85 can favorably tolerate torsion or the like of the vehicle body frame 20.

Explanation of Body

As shown in FIGS. 1 to 3, a depth of the body 30 is the maximum at a middle portion thereof in the travel direction and is decreased toward both the sides thereof in the travel direction and both the sides thereof in the vehicle width direction. Specifically, the body 30 include: a slant bottom 31 that defines the depth deeper toward the middle of the body 30; and side faces 32, 32 that guard respective edges of longer sides of the bottom 31 in the travel direction. On slant parts, which are slant in different directions, of a lower surface of the bottom 31, horizontal ribs 33, 33 are provided in a manner to traverse the slant parts in the vehicle width direction and so that ends of each of the horizontal ribs 33, 33 extend to outer faces of the side faces 32, 32.

The horizontal ribs 33 are mounted on the respective mount portions 204 of the first vertical frame 21 and the second vertical frame 22. Each of the horizontal ribs 33 is curved at the same curvature as that of the mount portion 204 so that the horizontal ribs 33 are respectively in close contact with the mount portions 204. Moreover, a pair of vertical ribs 34, 34 are provided in parallel in the travel direction on the lower surface of the bottom 31. The body 30 is mounted on the mount portion 204 at positions where the vertical ribs 34 intersect with the horizontal ribs 33 (see FIGS. 2 and 3).

Figure 11:
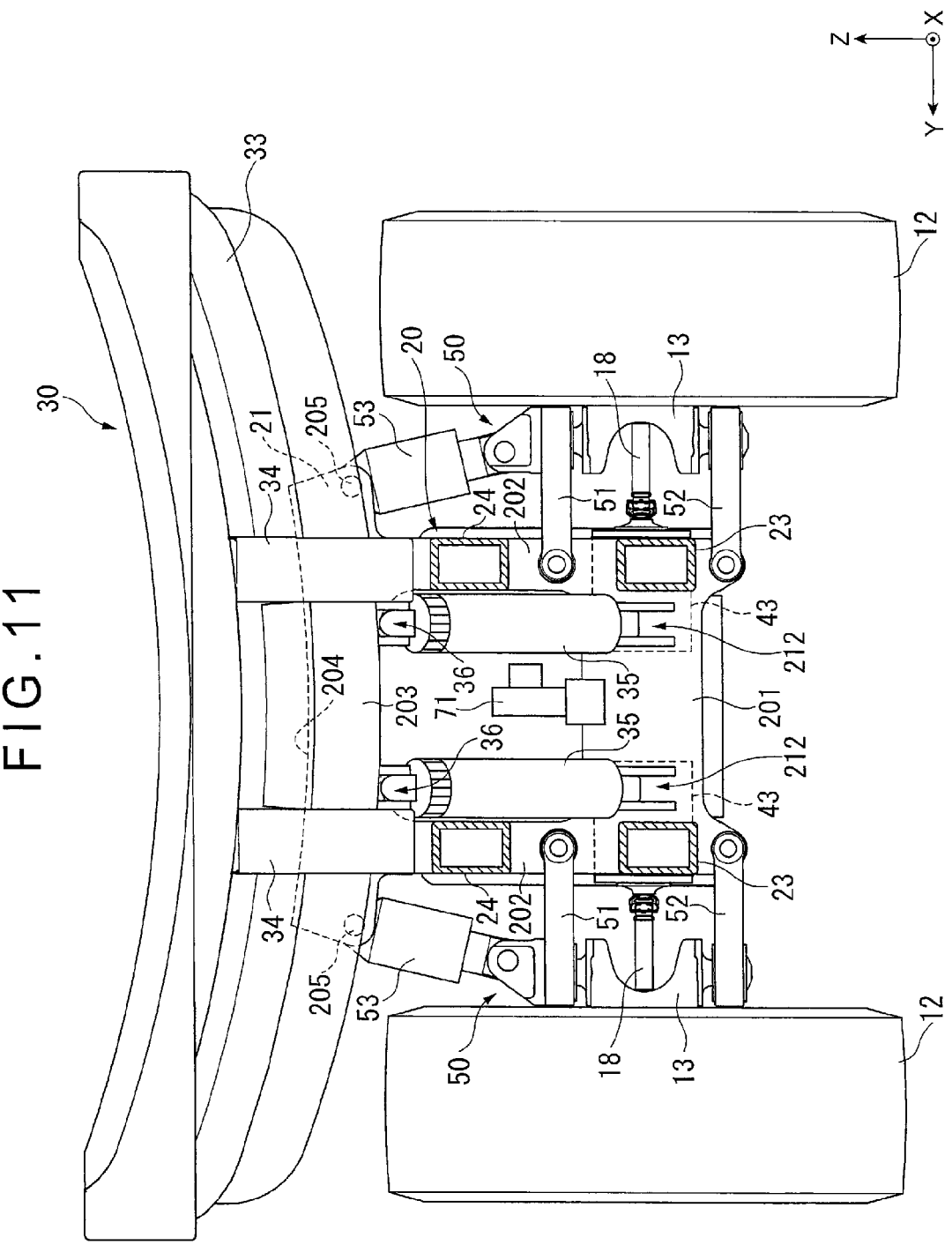
FIG. 11 is an illustration of an attachment position of a hoist cylinder in the travel direction, which is viewed in a direction indicated by an arrow XI-XI in FIG. 4.
Figure 12:
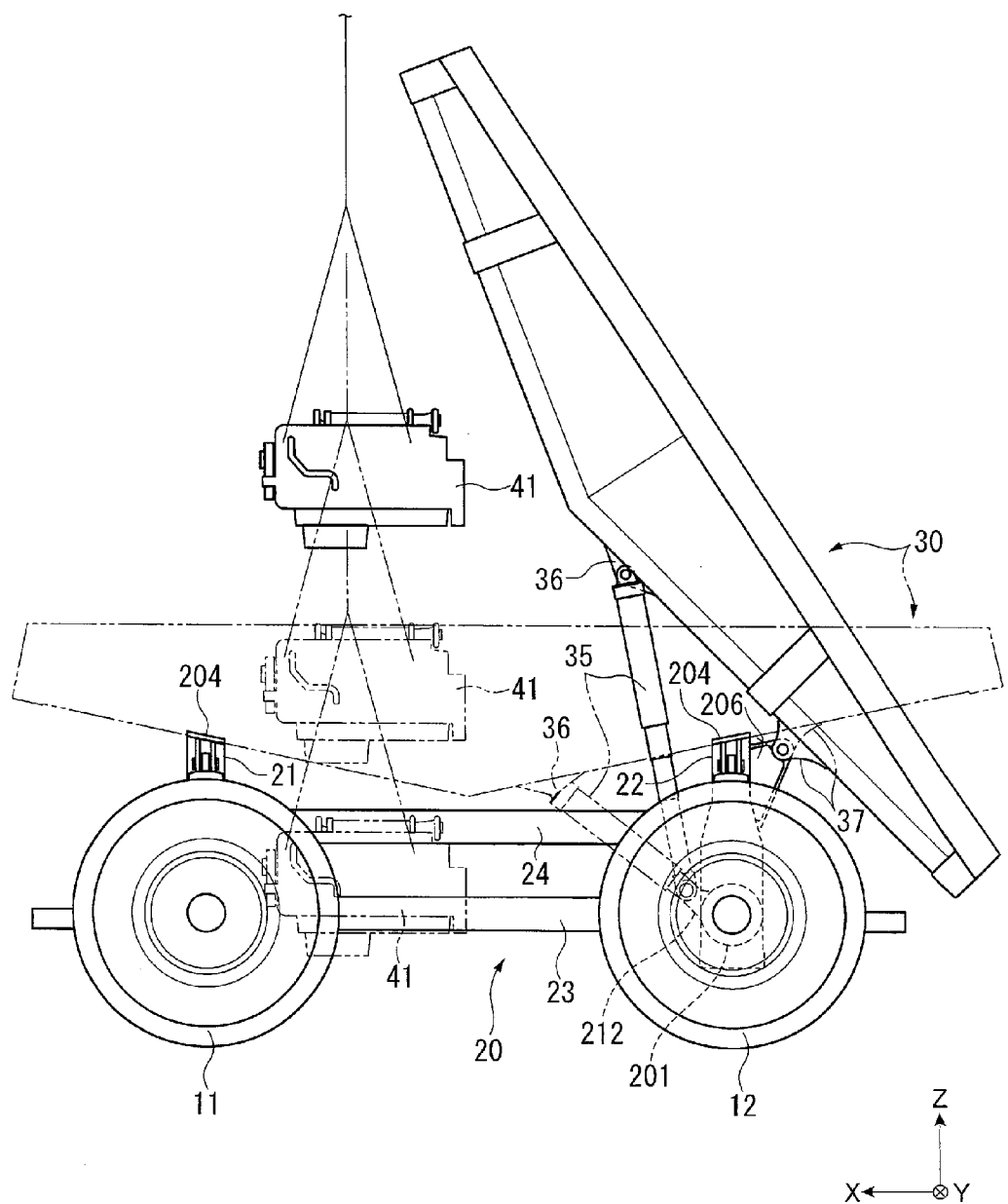
FIG. 12 is a side view showing the attachment position of the hoist cylinder.

Respective attachment portions 36, 36 to which upper ends of a pair of hoist cylinders 35, 35 are attached are provided on one of the slant parts of the lower surface of the bottom 31 (see FIGS. 1, 11 and 12). The hoist cylinders 35 are hydraulic actuators for raising and lowering the body 30. Lower ends of the hoist cylinders 35 are attached to the lower cross member 201 on which the second vertical frame 22 stands. In the middle of the one of the slant parts, a pair of pivot shafts 37, 37 connecting the body 30 to the vehicle body frame 20 so that the body 30 is pivotable are provided (only one of the pivot shafts 37, 37 is shown in FIGS. 2 and 12). The pivot shafts 37 are respectively supported on body supports 206, 206 extending from upper portions of the vertical members 202 to the upper cross member 203. Since the second vertical frame 22 stands at the position of the right and left tires 12 in a side view, in terms of the support position of the body 30 in the travel direction, the body 30 is supported on the vehicle body frame 20 at the position of the right and left tires 12 through the body support 206.

A shape of the entire body 30 is also substantially plane-symmetrical to the above-described vertical plane including the first center line 10A and substantially plane-symmetrical to the above-described vertical plane including the second center line 10B (see FIG. 1). The body 30 is mounted in the middle of the vehicle body frame 20 that is plane-symmetrical to the vertical plane including the first center line 10A and the second center line 10B. Consequently, a load distribution of the carrying load to be transmitted from the mount portion 204 of the vehicle body frame 20 to the tires 11 and 12 becomes equal. In other words, an entire load obtained by combining the vehicle load and the carrying load is transmitted to the tires 11, 12 at an even load distribution.

Explanation of Devices

Main devices shown in FIG. 1 are an engine 41, a generator motor 42 and a hydraulic pump (not shown) configured to be driven by an output of the engine 41, an electric motor 43 configured to be driven by electric energy generated by the generator motor 42 (see FIGS. 2 and 3), a first radiator 44 configured to radiate heat of a cooling water of the engine 41, a first cooling fan 45 configured to supply a cooling air to the first radiator 44, a second radiator 46 for a water-cooling type aftercooler 41A (see FIG. 9) configured to cool charge air delivered from an air cleaner through a supercharger to the engine 41, a second cooling fan 47 configured to supply a cooling air to the second radiator 46, a pair of brake resistors 48, 48 configured to convert kinetic energy of the tires 11, 12 to electric energy to generate Joule heat, a hydraulic fluid tank (not shown) configured to store a hydraulic fluid pumped from the hydraulic pump, and a pair of front and rear controllers 49, 49 configured to totally control travel of the dump truck 1.

Specific disposition of the devices 41 to 49 will be described later.

Explanation of Suspension

FIG. 5 is a cross-sectional view showing the suspension 50, which is viewed in a direction indicated by an arrow V-V in FIG. 4.

As shown in FIGS. 3 to 5, an independent double-wishbone-type suspension is employed as the suspension 50. The suspension 50 includes: substantially horizontal upper arm 51 and lower arm 52 each having up-and-down movable proximal ends supported by the vehicle body frame 20; a tire support in a form of a cylindrical casing 56 having an upper portion rotatably connected to a distal end of the upper arm 51 and a lower portion rotatably connected to a distal end of the lower arm 52; and a suspension cylinder 53 having an upper end rotatably connected to the vehicle body frame 20 and a lower end rotatably connected to the upper arm 51. The suspension cylinder 53 absorbs and attenuates impacts to the tires 11, 12 while transmitting the vehicle body load and the carrying load to the tires 11, 12. The casing 56 rotates and supports the tires 11, 12 through a final reduction gear 14. In the exemplary embodiment, the upper arm 51 and the lower arm 52 define a suspension arm according to the invention.

Specifically, a pair of proximal ends of the upper arms 51 having a bifurcated shape in a plan view are rotatably supported by the support in a form of an upper support 207 provided on a lower portion of the vertical member 202 of each of the first vertical frame 21 and the second vertical frame 22. A pair of proximal ends of the lower arm 52 having a bifurcated shape in a plan view are rotatably supported by a lower support 208 provided on a lower end of the lower cross member 201 on which each of the first vertical frame 21 and the second vertical frame 22 stands.

A distal end of the upper arm 51 is connected to an upper ball joint 57 provided to the upper portion of the casing 56. A distal end of the lower arm 52 is connected to a lower ball joint 58 provided to the lower portion of the casing 56. A top of the upper ball joint 57 is covered with a connecting bracket 54 fixed to an upper surface of the upper arm 51. The connecting bracket 54 is connected by the suspension cylinder 53 to the suspension support 205 of each of the first vertical frame 21 and the second vertical frame 22. At this time, the lower end of the suspension cylinder 53 is connected to the connecting bracket 54 at a position very close to the upper ball joint 57.

A king pin shaft 56A connecting a rotation center 57A of the upper ball joint 57 to a rotation center 58A of the lower ball joint 58 intersects with an axial line 53A of the suspension cylinder 53 at a connecting portion of the upper ball joint 57 of the casing 56 and the upper arm 51, specifically, within a range of a ball diameter of the upper ball joint 57, more specifically at a rotation center 57A of the upper ball joint 57 and the upper arm 51. Accordingly, the vehicle body load and the carrying load to be transmitted through the suspension cylinder 53 hardly act on the upper arm 51, but are transmitted to the tires 11, 12 through the casing 56 to which the upper ball joint 57 is provided. Consequently, since the carrying load is not transmitted to the upper arm 51 and the lower arm 52, respective structures of the upper arm 51 and the lower arm 52 can be simplified.

Herein, when the vehicle body 10 is moved up and down along with the up-and-down motion of the upper arm 51 and the lower arm 52, a positional relationship between the tires 11, 12 and the electric motor 43 is slightly shifted. The drive shaft 18 is connected to an output shaft 43A of the electric motor 43 and an input shaft 14A of the final reduction gear 14 via a universal joint in order to absorb the shift of the tires 11, 12 from the electric motor 43, and is structured in such a slide type that the drive shaft 18 is extendable and contractible in an axial direction in order to absorb a changed amount of a distance between the vehicle body frame 20 and the casing 56 to be generated when the tires 11, 12 move up and down.

Figure 6:
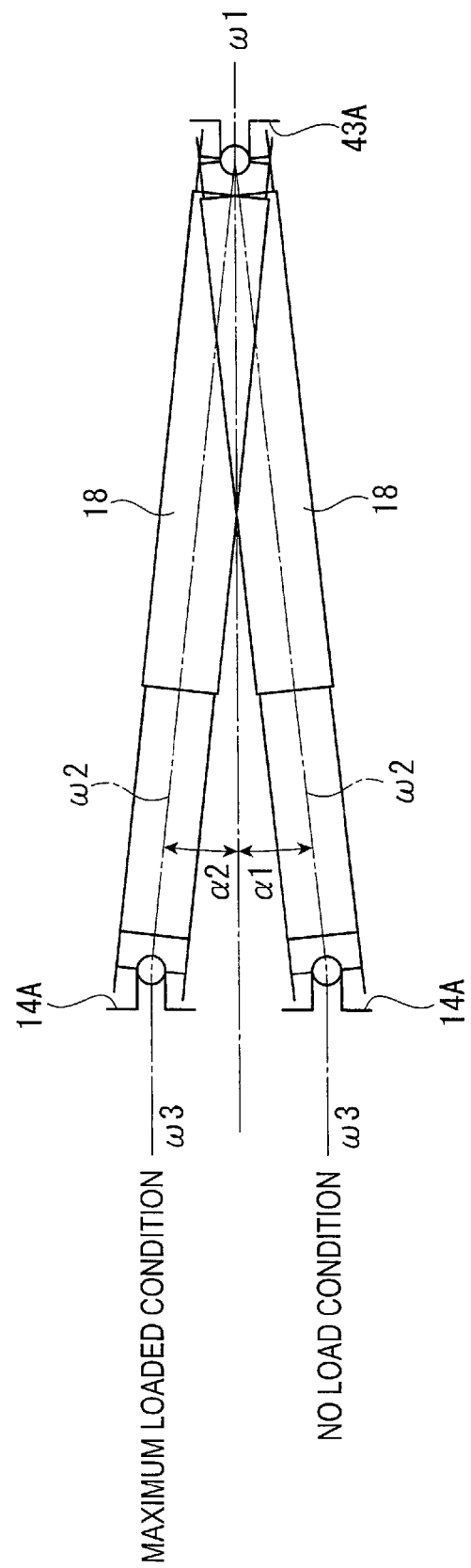
FIG. 6 is a schematic illustration for explaining an intersection angle.

Although the drive shaft 18 is shown horizontal in FIG. 5 for convenience, when no load is placed in the body 30, as shown in FIG. 6, the drive shaft 18 is actually inclined at an intersection angle $\alpha 1$ relative to the horizon with a distal end of the drive shaft 18 near the tire 11 facing downward. On the other hand, when the maximum load within the allowable load is placed in the body 30, the drive shaft 18 is inclined at an intersection angle $\alpha 2$ relative to the horizon with the distal end of the drive shaft 18 near the tire 11 facing upward. The intersection angles $\alpha 1$ and $\alpha 2$ are preferably in a range from 2.5 degrees to 3.5 degrees. In the exemplary embodiment, both of the intersection angles $\alpha 1$ and $\alpha 2$ are approximately 3 degrees. The intersection angles $\alpha 1$ and $\alpha 2$ are set by adjusting a strength of the suspension cylinder 53 or adjusting a distance between the connecting bracket 54 and the suspension support 205 that are connected by the suspension cylinder 53.

With the above arrangement, a change in the inclination angle of the drive shaft 18 relative to the horizon between when the load is placed and when no load is placed can be decreased, thereby inhibiting torsional vibration of the drive shaft 18 during travelling. For instance, if the drive shaft 18 is arranged to be horizontal at the intersection angle $\alpha 1$ of zero degree when no load is placed, the drive shaft 18 becomes largely inclined relative to the horizon at an angle close to the intersection angle $\alpha 2$ of about 6 degrees when the maximum load is placed, so that the torsional vibration during travelling is increased to reduce durability. In other words, when the drive shaft 18 is largely inclined, even during a constant speed travelling in which an angular speed $\omega 1$ of the output shaft 43A and an angular speed $\omega 3$ of the input shaft 14A are kept constant, an angular speed $\omega 2$ of the drive shaft 18 is changed depending on the size of the intersection angles $\alpha 1$ and $\alpha 2$, resulting in generation of torsional vibration. In the exemplary embodiment, such generation of torsional vibration can be inhibited to improve durability and the above-described universal joint can be employed well instead of an expensive constant-velocity joint capable of absorbing a large inclination angle.

Incidentally, for the sake of an easy understanding of the intersection angles $\alpha 1$ and $\alpha 2$, the intersection angles $\alpha 1$ and $\alpha 2$ are exaggeratingly shown in FIG. 6 to be larger than the actual angles.

Explanation of Steering Mechanism

Figure 7:
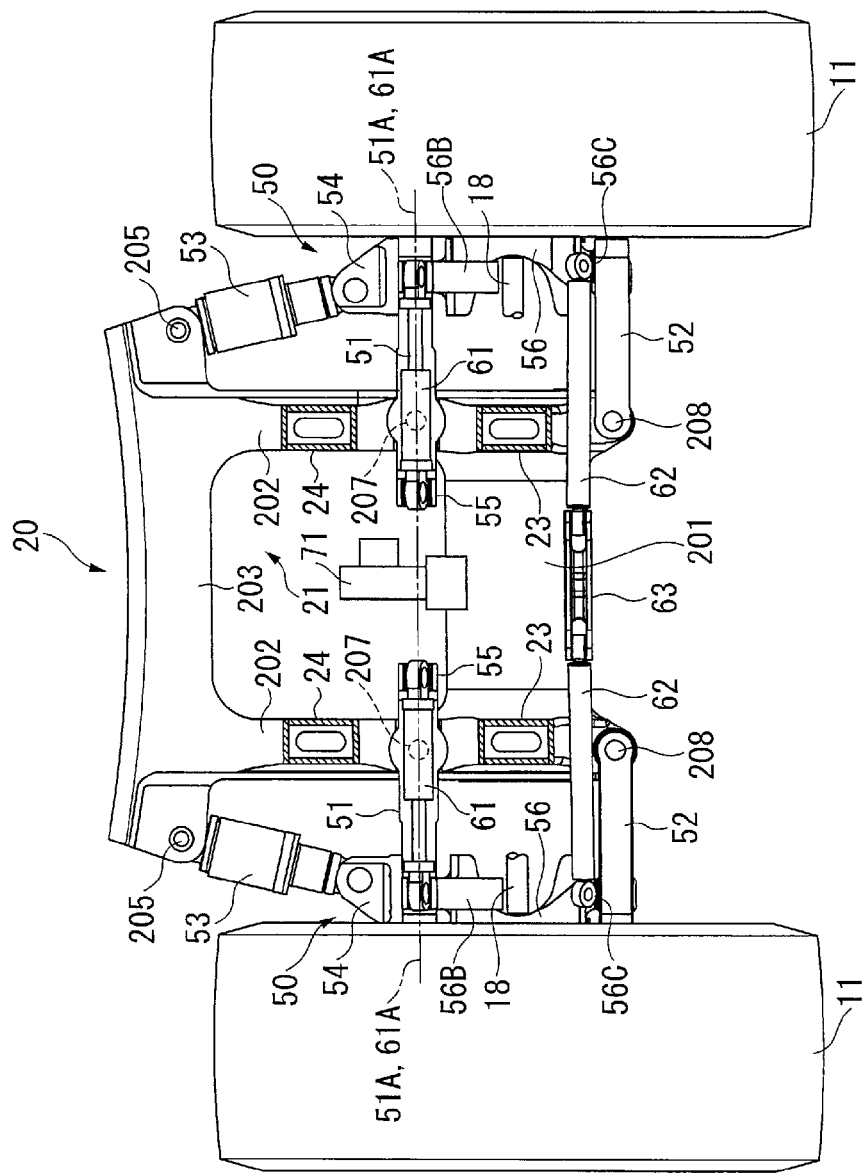
FIG. 7 is a cross-sectional view showing a steering mechanism, which is viewed in a direction indicated by an arrow VII-VII in FIG. 4.

FIG. 7 is a cross-sectional view showing the steering mechanism, which is viewed in a direction indicated by an arrow VII-VII in FIG. 4.

As shown in FIGS. 4 and 7, the steering mechanism is configured to move all the tires 11 and 12 using respective steering cylinders 61. The steering mechanism includes the steering cylinders 61 each having a proximal end attached to the upper arm 51 and a distal end attached to the casing 56.

Specifically, the bifurcated upper arm 51 integrally includes a cylinder attachment arm 55 having an L shape in a plan view. The cylinder attachment arm 55 horizontally extends inward from one of the proximal ends of the upper arm 51 to extend over the upper support 207 on the vertical member 202. Moreover, the casing 56 integrally includes a knuckle arm 56B extending in the same direction as the distal end of the cylinder attachment arm 55 in the plan view. The proximal end of the steering cylinder 61 is attached to the cylinder attachment arm 55 while the distal end of the steering cylinder 61 is attached to the knuckle arm 56B.

Moreover, a steering arm 56C extending in the travel direction in the plan view is integrally formed to the lower portion of the casing 56. The steering arm 56C includes first and second steering arms 56C in the vehicle width direction. The first and second steering arms 56C are connected by a pair of tie rods 62, 62 (on the sides) and a bell crank 63 (in the middle). By advancing and retracting each of the steering cylinders 61, the tires 11, 12 with the respective casings 56 are steered around the king pin shaft 56A via the knuckle arm 56B. This movement is mutually transmitted to the casings 56 in pair via the tie rods 62 and the bell crank 63, so that both the tires 11 (12) are steered in conjunction with each other.

Further, a distal end of the knuckle arm 56B is bent upward. A height of a connecting portion between the knuckle arm 56B and the steering cylinder 61 is set substantially the same as a height of the rotation center of the upper arm 51 and the casing 56, specifically, a height of the rotation center 57A of the upper ball joint 57. Accordingly, viewed in the travel direction, an axial line 61A of the steering cylinder 61 overlaps a line 51A passing through the rotation center 57A and traversing a motion center 207A of the upper arm 51 on the upper support 207. The respective up-and-down motions of the upper arm 51 and the steering cylinder 61 are exactly the same. Accordingly, respective up-and-down motion regions to be required for the upper arm 51 and the steering cylinder 61 to move up and down are the same when viewed in the travel direction (see FIGS. 5 and 7).

In this arrangement, the steering cylinder 61 is disposed adjacent to the lower cross member 201 along the vehicle width direction. On the lower cross member 201 near the second vertical frame 22, in other words, on the lower cross member 201 supporting the lower end of the hoist cylinder 35, the steering cylinder 61 is disposed opposite the hoist cylinder 35 in the travel direction across the lower cross member 201, in order to avoid interference with the hoist cylinder 35.

In the exemplary embodiment, since the proximal end of the steering cylinder 61 is attached not to the vehicle body frame 20 but to the cylinder attachment arm 55 integrated with the upper arm 51, even when the suspension 50 including the upper arm 51 is operated, a distance between the knuckle arm 56B and the cylinder attachment arm 55 of the upper arm 51 is hardly changed. Accordingly, a relationship between steering amounts of the respective tires 11, 12 and advancing and retracting amounts of the respective steering cylinders 61 becomes clear, so that advancing or retracting of the steering cylinders 61 for obtaining desired steering amounts of the steering cylinders 61 can be easily controlled.

Explanation of Support Structure and Cooling Structure of Electric Motor

Figure 8:
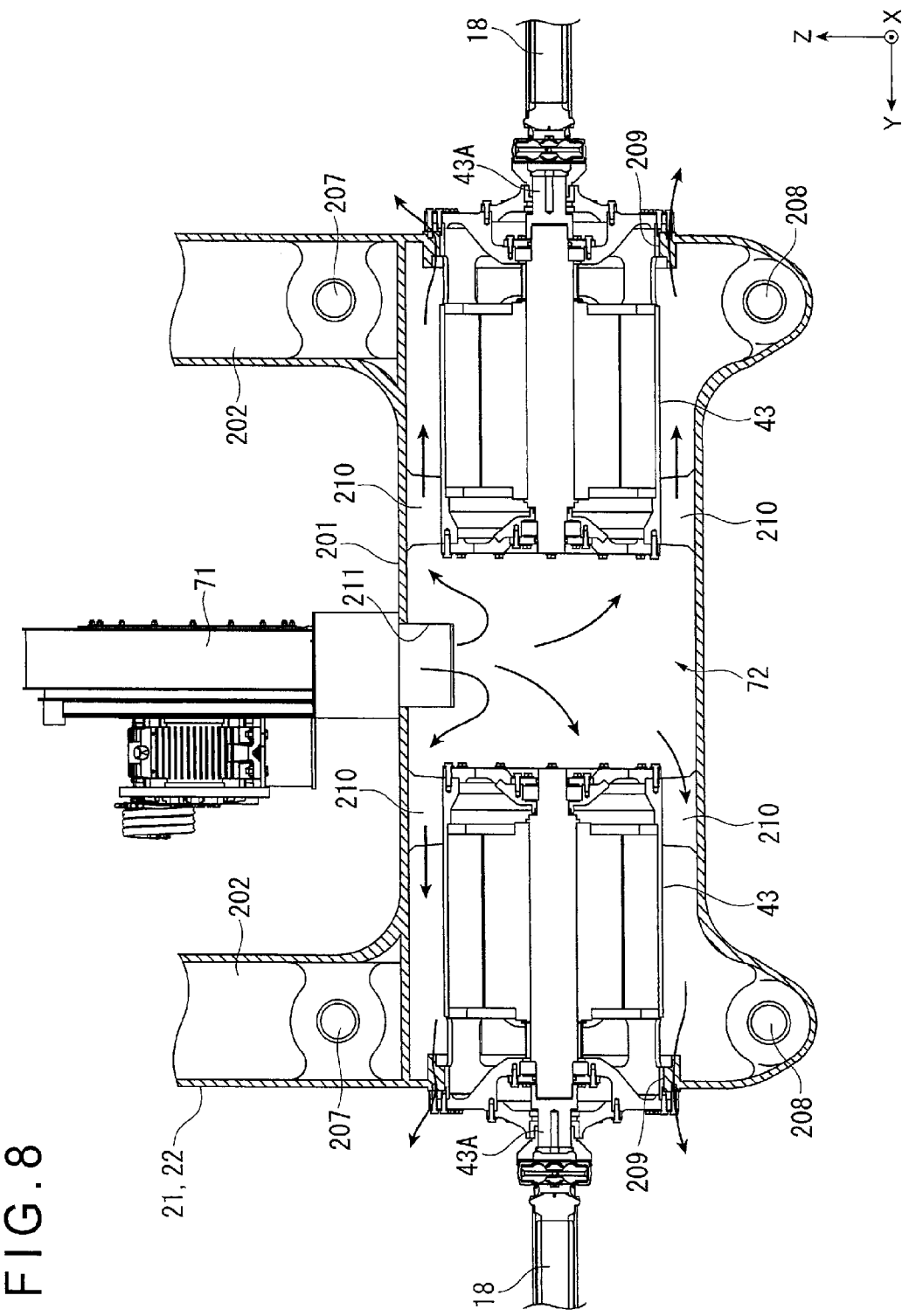
FIG. 8 is a cross-sectional view showing a support structure and a cooling structure of an electric motor.

FIG. 8 is a cross-sectional view showing a support structure and a cooling structure of the electric motor 43.

As shown in FIG. 8, the electric motors 43 are housed in both sides of a hollow portion of the lower cross member 201 on which each of the first vertical frame 21 and the second vertical frame 22 stands. Openings 209 are provided on both sides of the lower cross member 201. Each end of a body of the electric motors 43 close to the output shaft 43A is fixed around each of the openings 209 by an appropriate fastening unit.

Inside the lower cross member 201, a projection 210 projects from an inner surface of the hollow portion toward each of the electric motors 43. Accordingly, an end of each of the electric motors 43 opposite the output shaft 43A is supported by the inner surface of the hollow portion through the projection 210. The projection 210 is provided by a plurality of projections spaced from each other in a circumferential direction. Since the electric motors 43 are housed inside the lower cross member 201 and fixed to the lower cross member 201, the lower cross member 201 itself is reinforced by the electric motors 43, so that rigidity of the lower cross member 201 is improved.

An inflow port 211 for taking in a cooling air is provided on a center top of the lower cross member 201 in the vehicle width direction. A cooling blower 71 is attached at a position corresponding to the inflow port 211. Moreover, a predetermined gap (not shown) for discharging the cooling air to the outside is formed at each of fastening parts between the electric motors 43 and both the sides of the lower cross member 201. The cooling air supplied from the cooling blower 71 flows from the inflow port 211 to a space between a pair of electric motors 43 inside the lower cross member 201, and is subsequently branched toward the electric motors 43. The branched cooling air passes between the projections 210 to enter a space between the electric motors 43 and the lower cross member 201, flows to the ends while cooling the electric motors 43 from an outer circumference thereof, and flows to the outside from the gaps on both the sides of the lower cross member 201.

In the exemplary embodiment, the hollow portion of the lower cross member 201 defines a duct 72 configured to circulate the cooling air.

The arrangement for flowing the cooling air to the outside is not limited to the arrangement for flowing the cooling air to the outside from the gaps on the fastening units between the lower cross member 201 and the electric motors 43. A plurality of outflow openings, through which the cooling air is discharged, may be provided on both the sides of the lower cross member 201.

Explanation of Layout of Devices

FIG. 9 is a plan view showing a layout of the devices 41 to 49.

As shown in FIG. 9, the devices 41 to 49 are disposed on the vehicle body frame 20 as follows in consideration of a weight balance and maintenance capability of the vehicle body 10. Specifically, in the order from the first travel direction of the vehicle body frame 20 (in the order from the left to the right in FIG. 9), the controller 49, a pair of electric motors 43, 43 configured to drive the tires 11, the engine 41, the generator motor 42, a pair of electric motors 43, 43 configured to drive the tires 12, and a second controller 49 are disposed substantially in alignment. The engine 41 is the heaviest device among the above devices and is disposed closer to the middle of the vehicle body frame 20 than the first vertical frame 21.

In the middle of the vehicle body frame 20 in the travel direction, at a position outwardly away from the vehicle body frame 20 in the first vehicle width direction, the first radiator 44 for the engine 41 is disposed and the first cooling fan 45 is disposed to an inner side of the first radiator 44. At a position outwardly away from the vehicle body frame 20 in the second vehicle width direction, the second radiator 46 for the water-cooling type aftercooler 41A is disposed and the second cooling fan 47 is disposed to an inner side of the second radiator 46.

The first and second radiators 44 and 46 are substantially the same in size and the first and second cooling fans 45 and 47 are substantially the same in size. The first and second radiators 44 and 46 are disposed symmetrically with respect to the above-described second center line 10B and the first and second cooling fans 45 and 47 are disposed symmetrically with respect to the above-described second center line 10B (see FIG. 4). The first and second cooling fans 45 and 47 are suction fans. A cooling air sucked from the outside and having been subjected to heat exchange with the cooling water of the engine 41 at the first and second radiators 44 and 46 and a cooling air having been subjected to heat exchange with the cooling water of the aftercooler 41A are delivered toward the engine 41 and the generator motor 42 provided in the middle of the vehicle body frame 20 to cool the engine 41 and the generator motor 42 from outer sides thereof.

A pair of brake resistors 48, 48 covered with respective exterior covers are disposed on the second radiator 46 and the second cooling fan 47 (see FIG. 1). Cooling fans (not shown) configured to respectively cool the brake resistors 48 are housed inside the respective exterior covers. Such cooling fans are discharge fans. The brake resistors 48 are collectively disposed on one side of the vehicle body frame 20 in order to put priority on maintenance capability. Since the brake resistors 48 have a light weight compared with those of the other devices, a weight balance of the vehicle body 10 is less affected even by the disposition of the brake resistors 48 only on the one side of the vehicle body frame 20.

The first and second radiators 44 and 46, the first and second cooling fans 45 and 47, and the brake resistor 48 are mounted on the support frame 81. The support frame 81 is fixed to the lower side member 23 and the upper side member 24 of the vehicle body frame 20 by a fastening unit (e.g., a bolt).

At the outside of the vehicle body frame 20 in the first vehicle width direction, the first radiator 44 and the first cooling fan 45 bridge over a pair of L-shaped frames 85 juxtaposed in the travel direction to be supported by the frames 85 and are disposed in an area between the tires 11 and 12. The first radiator 44 and the first cooling fan 45 are mounted in the middle of the vehicle body frame 20 in the travel direction via the support frame 81 (see the first center line 10A in FIG. 1).

Similarly, at the outside of the vehicle body frame 20 in the second vehicle width direction, the second radiator 46 and the second cooling fan 47 bridge over the pair of L-shaped frames 85 juxtaposed in the travel direction to be supported by the frames 85. The second radiator 46 and the second cooling fan 47 are disposed in an area between the tires 11 and 12. The second radiator 46 and the second cooling fan 47 are mounted in the middle of the vehicle body frame 20 in the travel direction via the support frame 81 (see the first center line 10A in FIG. 1).

Attachment Position of Hoist Cylinder and Relationship Between Hoist Cylinder and Engine FIG. 11 is an illustration of an attachment position of the hoist cylinder 35 in the travel direction, which is viewed in a direction indicated by an arrow XI-XI in FIG. 4. FIG. 12 is a side view showing the attachment position of the hoist cylinder 35. However, the steering mechanism is not shown in FIG. 11.

As shown in FIGS. 11 and 12, upper ends of the pair of hoist cylinders 35 are rotatably attached to the attachment portions 36 provided in the middle of the lower surface of the body 30. At the second side of the vehicle body frame 20, a pair of hoist supports 212 are juxtaposed in the vehicle width direction on the lower cross member 201 on which the second vertical frame 22 stands. The lower ends of the pair of hoist cylinders 35 are rotatably supported by the respective hoist supports 212 to be supported near the set positions of the tires 12 in the travel direction. The hoist cylinders 35 set at such positions are supported with a large distance from the engine 41 and the generator motor 42 connected to the engine 41 near the hoist cylinders 35.

The hoist supports 212 are respectively provided at the positions where the electric motors 43 are housed in the lower cross member 201, in other words, at the positions reinforced by the electric motors 43 in the lower cross member 201. Moreover, the lower cross member 201 is a member on which the second vertical frame 22 provided with the body support 206 stands. Accordingly, the portion to receive the carrying load of the standing body 30 is focused on the second vertical frame 22 and the lower cross member 201 positioned between the right and left tires 12. The carrying load is transmitted from the body supports 206 and the hoist supports 212 of the hoist cylinders 35 to the road surface immediately under the tires 12 through the suspension 50 and the tires 12. The carrying load does not act on the lower side member 23 and the upper side member 24 (see FIG. 12).

As shown by solid lines in FIG. 12, the body 30 is raised in the second travel direction by extending the hoist cylinder 35, thereby performing an unloading operation. When the body 30 is sufficiently raised at or exceeding a predetermined angle, the hoist cylinders 35 substantially vertically stand. In such a condition, a large open-top space is defined from the first vertical frame 21 to the middle of the vehicle body frame 20, in other words, above the portion where the engine 41 is mounted. Since the body 30 and the hoist cylinders 35 are not present in this space, the engine 41 disposed near the middle of the vehicle body frame 20 can be suspended with a wire or the like with use of this space and is configured to be moved up and down while being suspended when the engine 41 is detached and attached for maintenance.

In addition, the engine 41 is disposed in a region defined by the first vertical frame 21, the second vertical frame 22, a pair of right and left lower side members 23, and a pair of right and left upper side members 24. As shown in FIG. 12, there is an open space between the lower side members 23 and the upper side members 24 so that the engine 41 is accessible from the outside of the vehicle body frame 20. With this arrangement, even while the engine 41 is mounted on the vehicle body frame 20, maintenance of the engine 41 can be easily conducted from the right and left sides of the vehicle body frame 20.

Travelling of Driverless Dump Truck

The above-described dump truck 1 travels between a loading site where dug minerals are taken in the dump truck 1 as a load and an unloading site where the load is unloaded.

At this time, when the dump truck 1 travels on an outward road toward the unloading site, the side of the dump truck 1 supporting the body 30, in other words, near the second vertical frame 22 is defined as the back (rear) of the dump truck 1 and the side thereof near the first vertical frame 21 is defined as the front of the dump truck 1. When the dump truck 1 travels on a return road after the unloading, since the dump truck 1 is not turned around, the side of the dump truck 1 near the second vertical frame 22 is defined as the front of the dump truck 1 and the side thereof near the first vertical frame 21 is defined as the back (rear) of the dump truck 1 (shuttle travelling).

However, the dump truck 1 may be turned around as needed and travel with either the first vertical frame 21 or the second vertical frame 22 constantly defined as the front of the dump truck 1.

It should be understood that the scope of the invention is not limited to the above-described exemplary embodiment(s) but includes modifications and improvements as long as the modifications and improvements are compatible with the invention.

For instance, in the above exemplary embodiment, the electric motor 43 is configured to drive the tires 11 and 12. However, a driving unit for the tires 11 and 12 is not limited to the electric motor 43, but a hydraulic motor may replace the electric motor 43.

Moreover, instead of housing the hydraulic motor or the electric motor in the lower cross member 201, the hydraulic motor or the electric motor may be disposed inside the tires 11 and 12 to be defined as an in-wheel motor.

Further, a driving force of the engine 41 may be transmitted via a differential device and a drive shaft to drive the tires 11 and 12.

In the above exemplary embodiment, the suspension 50 is provided by a double wishbone type suspension including the upper arm 51 and the lower arm 52. However, the suspension of the invention is not limited to the double wishbone type suspension. For instance, the suspension 50 may be provided by a McPherson strut type suspension including an up-and-down movable arm supported by the lower portion of the vehicle body frame 20 and a suspension cylinder connecting the upper portion of the vehicle body frame 20 to the arm. In this arrangement, the proximal end of the steering cylinder is supported by the arm.

In the above exemplary embodiment, the body support 206 supporting the body 30 in a manner to raise or lower the body 30 is provided on the second vertical frame 22 disposed in the second travel direction, and the lower ends of the hoist cylinders 35 for raising and lowering the body 30 are supported by the lower cross member 201 on which the second vertical frame 22 stands. However, the lower ends of the hoist cylinders 35 may be supported by the lower cross member 201 on which the first vertical frame 21 stands. In this arrangement, on the lower cross member 201 near the first vertical frame 21, it is only necessary to dispose the steering cylinder 61 opposite the hoist cylinders 35 in the travel direction across the lower cross member 201, in order to avoid interference between the steering cylinder 61 and the hoist cylinders 35.

In addition, the above exemplary embodiment is not exhaustive, but it may be determined accordingly in each case which portion of the upper arm 51 is attached with the proximal end of the steering cylinder 61 or which position is set as the connecting position between the steering cylinder 61 and the knuckle arm 56B.

The invention is also applicable to a manned off-road dump truck including a cab.

The invention claimed is:

1. A dump truck comprising:
a vehicle body frame;
a suspension;
a steering mechanism;
tires suspended from the vehicle body frame via the suspension and configured to be steered by the steering mechanism and travel the dump truck; and
a body supported by the vehicle body frame and configured to be raised and lowered,
the suspension comprising:
a suspension arm comprising an up-and-down movable proximal end supported on the vehicle body frame; and
a tire support rotatably attached to a distal end of the suspension arm,
the steering mechanism comprising: a steering cylinder comprising a proximal end attached to the suspension arm and a distal end attached to a knuckle arm provided to the tire support, wherein
the suspension arm comprises an upper arm and a lower arm that are each attached to the vehicle body frame, the upper arm being positioned above the lower arm, and
the proximal end of the steering cylinder is attached to the upper arm.

2. The dump truck according to claim 1, wherein
the vehicle body frame comprises a support that supports the suspension arm such that the suspension arm is movable up and down,
the upper arm comprises a steering cylinder attachment arm extending over the support and further extending inward in a vehicle width direction, and
the proximal end of the steering cylinder is attached to the steering cylinder attachment arm.

3. The dump truck according to claim 1, wherein
viewed in a travel direction, the steering cylinder has an axial line overlapping a line passing through a rotation center of the upper arm and the tire support and traversing a motion center of the upper arm on the vehicle body frame.

4. The dump truck according to claim 1, wherein
the vehicle body frame comprises a cross member provided in the vehicle width direction,
the cross member supports a lower end of a hoist cylinder configured to raise and lower the body, and
the steering cylinder is disposed opposite the hoist cylinder across the cross member in the travel direction.

5. A dump truck comprising:
a vehicle body frame;
a suspension;
a steering mechanism;
tires suspended from the vehicle body frame via the suspension and configured to be steered by the steering mechanism and travel the dump truck; and
a body supported by the vehicle body frame and configured to be raised and lowered,
the suspension comprising:
an upper arm comprising an up-and-down movable proximal end supported on an upper support provided to the vehicle body frame;
a lower arm comprising an up-and-down movable proximal end supported on a lower support provided to the vehicle body frame; and
a tire support rotatably attached between respective distal ends of the upper and lower arms, wherein
the upper arm comprises a steering cylinder attachment arm extending over the support and further extending inward in a vehicle width direction,
the steering mechanism comprises a steering cylinder comprising a proximal end attached to the steering cylinder attachment arm and a distal end attached to a knuckle arm provided to the tire support, and
viewed in the travel direction, the steering cylinder has an axial line overlapping a line passing through a rotation center of the upper arm and the tire support and traversing a motion center of the upper arm on the vehicle body frame.

* * * * *